P. LUX.
SHIP'S BELLS CLOCK.
APPLICATION FILED MAY 11, 1908.

927,568.

Patented July 13, 1909.
3 SHEETS—SHEET 1.

Witnesses
C. J. Reed.
C. L. Weed.

Paul Lux, Inventor
by Seymour & Earle
Attys

P. LUX.
SHIP'S BELLS CLOCK.
APPLICATION FILED MAY 11, 1908.

927,568.

Patented July 13, 1909.
3 SHEETS—SHEET 2.

P. LUX.
SHIP'S BELLS CLOCK.
APPLICATION FILED MAY 11, 1908.
927,568.
Patented July 13, 1909.
3 SHEETS—SHEET 3.
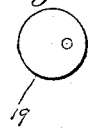
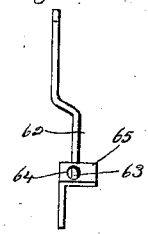
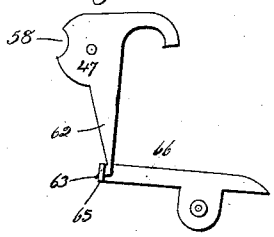
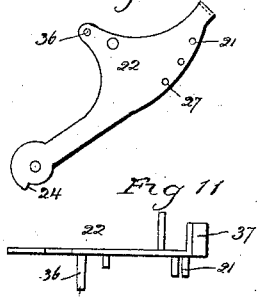
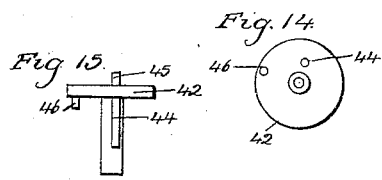
Witnesses
C. J. Reed.
C. L. Weed.
Paul Lux
Inventor
by Seymour & Earle

UNITED STATES PATENT OFFICE.

PAUL LUX, OF WATERBURY, CONNECTICUT, ASSIGNOR TO WATERBURY CLOCK CO., OF WATERBURY, CONNECTICUT, A CORPORATION.

SHIP'S-BELLS CLOCK.

No. 927,568.  Specification of Letters Patent.  Patented July 13, 1909.

Application filed May 11, 1908. Serial No. 432,244.

*To all whom it may concern:*

Be it known that I, PAUL LUX, a citizen of the United States, residing at Waterbury, in the county of New Haven and State of Connecticut, have invented a new and useful Improvement in Ship's-Bells Clocks; and I do hereby declare the following, when taken in connection with the accompanying drawings and the numerals of reference marked thereon, to be a full, clear, and exact description of the same, and which said drawings constitute part of this specification, and represent, in—

Figure 1:
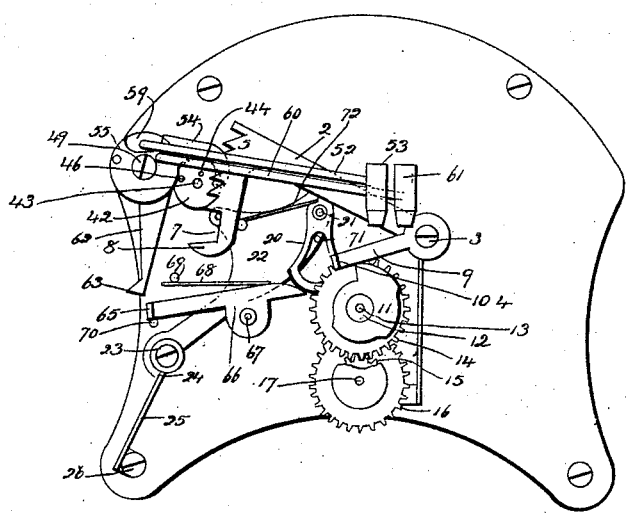
Figure 2:
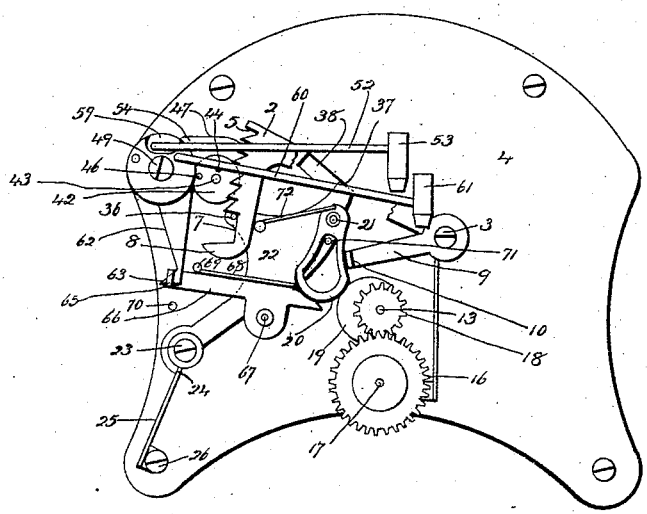
Figure 3:
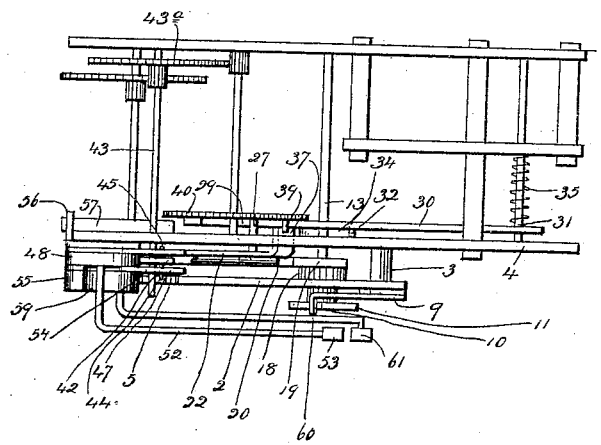
Figure 4:
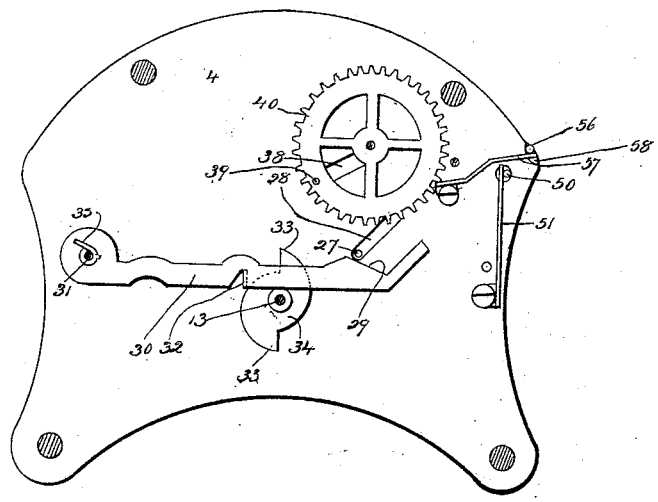

Figure 1 a view in rear elevation of my improved ship's bells clock ready to strike the hour. Fig. 2 a corresponding view showing the parts in their positions at the close of striking the half hour with one hammer in its elevation position. Fig. 3 a plan view of the clock. Fig. 4 a view thereof in vertical section looking rearward toward the inner face of the rear movement-plate and showing the lifting lever and lifting cam, as well as the fourth wheel of the striking train and the two hammer-springs. Fig. 5 a detached view in elevation of the half-hour eccentric. Fig. 6 a corresponding view of the half-hour switch. Fig. 7 a plan view thereof. Fig. 8 a detached view showing the half-hour lever and the combined hammer-lifting arm, and half-hour finger of the outside hammer. Fig. 9 an edge view of the parts shown in Fig. 8. Fig. 10 a detached view in elevation of the locking lever. Fig. 11 a plan view thereof. Fig. 12 a detached view of the snail. Fig. 13 a corresponding view of the rack. Fig. 14 a detached view in elevation of the gathering hub. Fig. 15 a plan view thereof.

My invention relates to an improvement in ship's bells clocks, that is to say, clocks constructed to strike ship's time instead of land time, ship's time dividing the twenty-four hours of a day into six watches, each divided into half hour spaces counted from the beginning of each watch so that the half hours are always struck on an odd number. Thus the "forenoon" watch from 8 to 12 a. m. will be struck as follows:—8 o'clock 8 bells, 8:30 o'clock 1 bell, 9 o'clock 2 bells, 9:30 o'clock 3 bells, 10 o'clock 4 bells, 10:30 o'clock 5 bells, 11 o'clock 6 bells, 11:30 o'clock 7 bells.

My present invention relates to ship's bells clocks of the type employing two hammers, the object being to produce a simple, compact and reliable clock.

With these ends in view my invention consists in a ship's bells clock having certain details of construction and combinations of parts as will be hereinafter described and pointed out in the claims.

In carrying out my invention as herein shown, I employ a rack-arm 2 hung upon a stud 3 mounted in the rear movement-plate 4, the arm being furnished with a segmental rack 5 formed at its lower end with a locking-notch 7 and an outwardly bowed guarding-finger 8. A snail-finger 9 mounted concentrically with the arm 2 and rigid therewith is formed at its end with a beveled finger 10 riding upon the edge of a snail 11 carried by a hub 12 turning loosely upon the center-arbor 13 and also carrying a wheel 14 meshing into a pinion 15 rigid with a wheel 16 loosely turning upon a stud 17 and meshing into a pinion 18 fixed upon the arbor 13, the said pinions and wheels being "calculated" so that the hourly rotation of the pinion 16 will effect the rotation of the snail 11 once in four hours. The snail 11 it may be noted, is "plotted" with reference to controlling the dropping of the arm 2 and rack in accordance with the requirements of striking ship's bells on the hour and on the half hour conformably with the schedule above given.

Upon the projecting rear end of the arbor 13 I fix a half-hour eccentric 19 making an hourly revolution with the said arbor 13 and hourly coacting with a skeleton-like pivotal half-hour switch 20 suspended at its upper end from a pin 21 in the upper end of a locking-lever 22 turning upon a stud 23 passing through its lower end and mounted in the said plate 4, this lever being formed at its extreme lower end with a shoulder 24 for engagement by a spring 25 attached to the said plate 4 by a screw 26 and exerting a constant effort to throw the lever 22 from left to right. The reason for the characterization of the eccentric 19 and switch 20 by the term "half hour" will appear later on. The said locking-lever 22 is lifted from right to left against the tension of the spring 25 by means of a lifting pin 27 carried by it and projecting inward from it through a slot 28 in the plate 4 into position to be engaged by the bevel 29 of a lifting-lever 30 carried by an arbor 31 and formed with a beveled finger 32 successively engaged by the two teeth 33 of a lifting-cam 34 revolving once an hour with the arbor 13 upon which it is mounted in position to lie close to the inner face of the plate 4. The said cam 34 by its teeth 33 lifts the said lifting-lever 30 against the tension of its spring 35 once every 30 minutes whereby the locking-lever 22 is lifted once every 30 minutes from right to left against the tension of its spring 25. As the said locking-lever 22 is lifted from right to left as described, the locking-pin 36 carried by it is lifted out of the locking-notch 7 in the rack 5 which is thus unlocked and left free to drop until the snail-finger 9 engages with the edge of the snail 11 the position of which determines the extent to which the rack drops, and therefore the number of its teeth which pass below the locking-pin 36. This unlocking of the rack takes place just before the locking-lever 22 reaches the limit of its lifting movement under the action of the cam 34. As the lever is still further lifted the locking-finger 37 bent inward at a right angle from its extreme upper end and extending inward through a slot 38 in the rear movement plate 4, is disengaged from a stop-pin 39 in the fourth wheel 40 of the striking train which on being released, starts the gathering-hub 42 mounted upon the projecting rear end of the arbor 43 of the third wheel 43ª of the striking train, which may be of any approved construction. The said hub 42 is furnished with a gathering-pin 44 which, as the hub 42 revolves from right to left, engages with the teeth of the rack and lifts the same tooth by tooth until its locking-notch 7 has been registered with the locking-pin 36 of the locking-lever 22 which is then swung by its spring 25 from left to right, whereby its locking-finger 37 is brought into position to collide with the stop-pin 39 and thus stop the wheel 40 and arrest the striking train. The gathering-hub 42 is provided with two hammer-lifting pins 45, 46, the former being, as shown, merely an extension of the gathering-pin 44 which is located considerably closer to the center of the hub 42 than the pin 46.

The hammer-lifting pin 45 extends inward from the hub 42 for engagement with the end of a hammer-lifting arm 47 secured to a hammer-hub 48 which is mounted upon a hammer-hub screw-stud 49 in the movement-plate 4, the hammer-hub 48 being provided with an inwardly projecting pin 50 which engages with a hammer-spring 51 mounted upon the inner face of the plate 4 as shown in Fig. 4. The said hub 48 has mounted in it a hammer-tail 52 carrying a hammer 53 which, for convenience, I shall hereafter speak of as the outer hammer. The said hammer-lifting pin 46 projects forward from the gathering-hub 42 and engages with the end of a hammer-lifting arm 54 secured to a hammer-hub 55 also mounted upon the stud 49 aforesaid, and provided with an inwardly projecting pin 56 engaging with a hammer-spring 57 applied to the inner face of the movement plate 4 also shown in Fig. 4, the hub 48 being formed in its periphery with a notch 58 for the clearance of the pin 56 and the hub 55 being formed with a notch 59 for the clearance of the hammer-tail 52. The said hub 55 has mounted in it a hammer-tail 60 carrying a hammer 61 located close to, but, so to speak, inside of the hammer 53 before mentioned and for that reason I shall speak of it as the inner hammer. Under this construction the outer and inner hammers have a common axis, namely, the screw stud 49, and the hammers having a common axis are therefore adapted to be operated by a single gathering-hub 42 which may therefore be said to be common to both hammers. The pins 45 and 46 being located relatively near each other, operate to successively lift the hammers 53 and 61 in quick succession so as to give the effect of a double stroke on the bell which is not shown. If preferred I might have a bell for each hammer. The gathering-pin 44 forming a part of the hammer-lifting pin 45 is located so close to the center of the gathering-hub 42, that in the rotation of the said hub, it clears the end of the hammer-lifting arm 47. Every time the hub 42 makes a revolution both hammers will be lifted and dropped so as to cause each of them to strike the bell once with a short interval between the strokes after the manner of striking a ship's bell by hand. To this last statement exception must be made that as on the half hours throughout the watches the bell is struck an odd number of strokes as already explained, one of the two hammers must be caught and not allowed to fall the second time at the end of stroking the half hours. For this purpose I employ a half-hour finger 62 made integral with the hammer-lifting arm 47 and formed at its lower end with a toe 63 arranged to strike into a hole 64 in an arm 65 turned outward at a right angle from the outer end of a horizontally arranged half-hour lever 66 located adjacent to the outer face of the locking-lever 22 and below the rack 5 and rocking upon a stud 67 in the plate 4. This lever is furnished with a spring 68. Its rocking movement is limited by two stop-pins 69 and 70 and its inner end is beveled for coaction with the rounded lower end of the half-hour switch 20 the swinging movement of which is limited by a stop pin 71 in the locking lever 22. A spring 72 tends always to swing the said switch from left to right. The half-hour eccentric 19 is fixed upon the center arbor 12 so that when the hours are struck, the eccentric will reach the limit of its movement to the right where it gives the maximum clearance for the half-hour switch 20. Therefore when at the conclusion of the rack-gathering function, the locking-pin 36 drops into the locking-notch 7 in the rack 5 and the locking-lever 22 is swung from left to right by its spring 25 the half-hour switch 20 finds nothing to collide with as it descends with the locking-lever 22 by which it is carried. It therefore fails to operate the halfhour lever 66 and the hammer 53 is not caught on the second stroke, but allowed to fall and strike the bell. During the next half hour, however, the half-hour eccentric 19 is moved into its operating position, that is to say, to the limit of its movement to the right.

Now when at the conclusion of the rack-gathering function the locking-pin 36 drops into the locking-notch 7 and the locking-lever 22 is again swung from left to right by its spring 25, the half-hour switch 20 in its descent collides with the half-hour eccentric 19 as shown in Fig. 2, whereby the switch is forced to perform a swinging movement from right to left against the tension of its spring 72. As the switch is thus forced by the eccentric to move from left to right, it engages with the beveled inner end of the half-hour lever 66 and crowds down upon the same so as to cause the outer end of the said lever to be lifted against the tension of its spring 68 as shown in Fig. 2, just in time to cause the toe 63 of the half-hour finger 62 to be caught in the hole 64 of the arm 65 of the half-hour lever, whereby the hammer 53 will, as it is released, by one or the other of the gathering-pins 45, be caught in its elevated position and not allowed to fall and make its second stroke upon the bell. This catching of the hammer 53 in its uplifted position only takes place on the half-hour and insures the odd stroke on the half-hour characteristic of ship's bells. In this way I provide for striking ship's bells on the hour and half hour without discarding the customary double stroke on the hours.

It will be observed that the two hammers and their hubs and hammer-lifting levers, and gathering-hub, and rack, and means for operating the rack, and means for catching one of the two hammers on the up-stroke on the half hours, are compactly arranged upon the rear or outer faces of the rear movement-plate substantially on one side of the vertical center thereof.

I claim:—

In a ship's bells clock, the combination with the rear and front movement-plates thereof, of two hammers, two hammer-hubs respectively carrying the said hammers and mounted upon a common axis projecting rearwardly from the rear or outer face of the rear movement-plate, two hammer-lifting levers respectively connected with the said hammer-hubs for the operation thereof, a gathering-hub located upon a stud projecting from the rear face of the rear movement-plate, hammer-lifting pins mounted in the said hub and respectively coacting with the said hammer-lifting levers, a gathering-pin in the gathering-hub, a rack located upon the rear face of the said rear movement-plate and coacting with the gathering-pin, means for operating the rack, and mechanism for catching one of the two hammers on the up-stroke on the half hours which are indicated by an odd number of strokes.

In testimony whereof, I have signed this specification in the presence of two subscribing witnesses.

PAUL LUX.

Witnesses:
CLEMENT I. GRIGGS,
CLIFFORD B. MORRIS.